United States Patent Office 3,282,831
Patented Nov. 1, 1966

3,282,831
REGENERATION OF ANIONIC EXCHANGE RESINS
George E. Hamm, Houston, Tex., assignor to Signal Oil and Gas Company, Los Angeles, Calif.
No Drawing. Filed Dec. 12, 1963, Ser. No. 329,947
5 Claims. (Cl. 210—32)

The present invention generally relates to purification of hydrocarbons and more particularly relates to an improved method of removing carbonyl sulfide from hydrocarbon streams.

Petroleum crude oils and the like usually contain substantial concentrations of sulfur-bearing compounds which must be removed before the oils are used for lubricating purposes, fuel purposes and the like. Accordingly, such oils are usually subjected to refining processes which substantially completely remove hydrogen sulfide and mercaptans therefrom. Similarly, normally gaseous hydrocarbon feed streams usually contain sulfur-bearing materials such as hydrogen sulfide, mercaptans and the like which are usually removed therefrom before further treatment of the feed stream. However, carbonyl sulfide usually is also present in substantial concentrations, and is difficult to efficiently remove from hydrocarbon fractions.

Various methods of removing carbonyl sulfide from hydrocarbon streams have been proposed, for example, that disclosed in U.S. Patent No. 2,713,077 to Robert W. Rieve. In that patent a process is disclosed in which a normally gaseous hydrocarbon stream is contacted in the gaseous state and at about room temperature with a wet fully hydrated form of an anionic exchange resin in the hydroxyl cycle. According to the patent, the carbonyl sulfide is removed from the hydrocarbon gas mixture by hydrolysis effected by the resin so that carbon dioxide and hydrogen sulfide result. During such removal, the anionic exchange resin is specified as gradually decreasing in activity to a point of complete inactivity. The resin is thereupon regenerated, according to the patent, by contacting it with a dilute aqueous solution of sodium hydroxide, after which it is washed in distilled water to remove excess sodium hydroxide. The wet regenerated resin is then reused while in the fully hydrated state to hydrolyze additional carbonyl sulfide. However, the initial efficiency of removal of carbonyl sulfide of the fresh resin is not exhibited by the regenerated resin, nor is such efficiency even approached even where relatively high concentrations of the carbonyl sulfide (about 10 percent) are present in the gaseous feed stream. This is probably due to the slow rate and incomplete extent of hydrolysis which can be effected by water and aqueous sodium hydroxide.

Accordingly, it would be highly desirable to provide an economical method of efficiently removing carbonyl sulfide down to very low concentrations, of the order of a few parts per million or less, in hydrocarbon feed streams, which streams may be either normally liquid or normally gaseous. It would further be desirable if the carbonyl sulfide could be efficiently removed from large volumes of hydrocarbons over extended periods of time.

Accordingly it is a principal object of the present invention to provide an improved method of removing carbonyl sulfide from hydrocarbon streams.

It is a further object of the present invention to provide an improved method for the removal of carbonyl sulfide to very low concentrations from hydrocarbon feed streams so that such removal can be carried out efficiently and economically for an extended period of time.

It is a still further object of the present invention to provide an improved method for the removal of carbonyl sulfide from hydrocarbons, which method makes it possible to operate at equally high efficiency, with both new and regenerated resin.

It is a still further object of the present invention to provide an improved method of regenerating anionic exchange resin which has become inactivated by carbonyl sulfide so as to restore the initial carbonyl sulfide-removing efficiency of the resin.

These and other objects are accomplished by the present improved method of removing carbonyl sulfide, whereby anionic exchange resin which is in the hydroxyl cycle and which need not be and preferably is not fully hydrated when initially used, is utilized to remove carbonyl sulfide from hydrocarbon feed streams, and wherein the resin is rapidly generated to at least about initial efficiency of fresh dry resin by treatment with an improved regenerating agent comprising a selected acid or amine. Thus, carbonyl sulfide can be recovered as such from fresh dry or regenerated wet or dry anionic exchange resin during regeneration of the resin, without accompanying detectable concentrations of the hydrolysis products of carbonyl sulfide, namely carbon dioxide and hydrogen sulfide. The improved method of carbonyl sulfide removal is capable of operating at high efficiency until the resin is nearly saturated. Thereupon, the exchange resin is, in accordance with the method, regenerated to at least about initial efficiency and capacity, so that it performs just as well or better for as long a period of time as new resin. This is in contrast to the substantial decline of the fresh resin in prior carbonyl sulfide removal systems and the incomplete regeneration thereof in prior resin regeneration procedures. The present regeneration procedure is carried out utilizing selected regeneration agents capable of fully regenerating the resin and completely removing carbonyl sulfide from the resin. Moreover, the regeneration is accomplished in a simple, rapid, economical manner without deterioration of the resin.

As a specific example of the present method, a normally gaseous dry hydrocarbon stream comprising propylene containing about 35 p.p.m. (parts per million) of carbonyl sulfide, calculated as sulfur, was liquefied and maintained therein at about 200 p.s.i. The propylene was passed in liquefied form and at ambient temperature through a bed of anion exchange resin comprising Amberlyte IRA–400 anion exchange resin which was dry (containing only bound water) and in the hydroxyl cycle. Amberlyte IRA–400 is the U.S. registered trademark of the Rohm and Haas Company, Philadelphia, Pennsylvania, and designates a resin which comprises the reaction product of a tertiary amine with a haloalkylated vinyl aromatic hydrocarbon copolymer. (This resin is described in detail in U.S. Patent No. 2,591,573.) The resin removed carbonyl sulfide to below a detectable minimum of less than 1 p.p.m., calculated as sulfur, from the propylene until more than 84 barrels of the liquefied propylene per cubic foot of the resin had been passed through the resin. The processed propylene remained dry, so that it passed a low dew point test.

After discontinuing the flow of propylene therethrough, the resin was regenerated by treating it with 8 volumes of each of the following solutions in the following sequence: a 10 percent aqueous hydrochloric acid solution, a water wash, a 15° Baumé aqueous caustic (sodium hydroxide) solution, and finally, another water wash. The regenerated Amberlyte IRA–400 resin was then used wet and tested in the same manner, utilizing identical feed, as the fresh resin. It was found that the wet regenerated resin was as effective as the fresh resin in removing carbonyl sulfide from the liquefied propylene down to below a detectable limit, i.e., below one part per million even after 84 barrels of liquefied propylene containing 35 p.p.m. carbonyl sulfide had passed through the regenerated resin.

Further advantages of the present invention will be apparent from a study of the following detailed description.

In accordance with the method of the present invention, hydrocarbons and hydrocarbon mixtures are treated, in either liquid or gaseous state, to remove carbonyl sulfide therefrom. The hydrocarbons may be normally gaseous hydrocarbons such as methane, propane, ethylene, propylene, and the like, or mixtures thereof, which normally gaseous hydrocarbons have or have not been liquefied and, if liquefied, are preferably maintained in the liquid state during carbonyl sulfide removal. It has been found that the present method is somewhat more efficient when the hydrocarbon feed stream is in the liquefied state. Normally liquid hydrocarbon feed streams can also be treated in the liquid state for removal of carbonyl sulfide, for example hexanes, pentanes, butanes, catalytically cracked gasoline, kerosene and the like.

The hydrocarbon feed stream is contacted at about ambient temperature or at any other suitable temperature with a bed of suitable anion exchange resin in the hydroxyl cycle. The effectiveness of the exchange resin bed is not materially changed by variations in the temperature of the bed or of the hydrocarbon feed, within reasonable limits, i.e., so long as the resin is not crushed or otherwise deteriorated by excess pressure. The anion exchange resin may be any suitable commercially available resin or the like, such as those anionic resins which are the reaction products of tertiary amines and haloalkylated vinyl aromatic hydrocarbon copolymers and which are described in U.S. Patent No. 2,591,573 and commercially sold under the trade name Amberlyte by Rohm and Haas Company, Philadelphia, Pennsylvania. One such suitable resin is Amberlyte IRA–400, as previously described. Another suitable anionic exchange resin is Ionac A–260, a quaternary amine type anionic exchange resin, the U.S. registered trademark of the Ionac Chemical Co., Division of Pfaudler Permutit Inc., Birmingham, New Jersey. Ionac A–300, a tertiary amine, moderately basic type of anionic exchange resin from the same company is also suitable, as are Ionac A–315 (weakly basic, polystyrene base, polyamine type resin), Ionac A–50 (trimethylamine, strongly basic polystyrene quaternary amine type resin), and others.

Fresh resin is placed in the hydroxyl cycle, if not already in the same, by contacting it with dilute base, for example, a 5–15 percent, by volume, aqueous solution of sodium hydroxide or potassium hydroxide. The fresh resin can then be used fully hydrated, that is, wet and therefore containing bound and unbound water, or dry, i.e., unhydrated or dehydrated, that is, surface dried and containing only bound water, preferably the latter, since the efficiency of the fresh resin is considerably greater when dry. As an example, the fresh resin can be converted to the hydroxyl cycle with aqueous NaOH, preferably water washed, allowed to drip dry and stored in the dry state for as long as desired, for example, for several months or more until it is completely free of all water except bound water, after which it can be used directly in the dry dehydrated condition without wetting it, since the resin need not depend for its effectiveness upon hydrolyzing the carbonyl sulfide to carbon dioxide and hydrogen sulfide. It has been found that, in fact, hydrolysis of carbonyl sulfide by the hydrated anionic resin proceeds slowly, especially with resin regenerated by the usual methods. So also does hydrolysis of carbonyl sulfide by water or a caustic solution or the like. It has been found that such hydrolysis is too slow and/or incomplete to be commercially acceptable either for the removal of carbonyl sulfide from a hydrocarbon feed stream or the removal of carbonyl sulfide from an anionic exchange resin containing the same. Regeneration of such exchange resin containing carbonyl sulfide by hydrolysis of carbonyl sulfide from the resin does not restore the initial efficiency of the resin for carbonyl sulfide removal.

In contrast, in the preferred embodiment of the present method, fresh dry dry anionic exchange resin and anionic exchange resins, whether wet or dry, regenerated in accordance with the invention, are used, which resins remove carbonyl sulfide from the hydrocarbon stream by holding it in some special type of bond, the exact nature of which has not been determined, but which bond retains the integrity of the carbonyl sulfide and is distinct from holding the hydrolyzed products carbon dioxide and hydrogen sulfide. It is believed, although the present invention is not limited thereto, that such resin holds the carbonyl sulfide in the following manner:

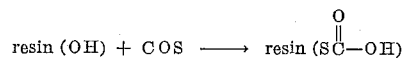

Alternatively, the resin may merely adsorb the carbonyl sulfide. During regeneration of such resin, the carbonyl sulfide is rapidly and completely removed therefrom wholly intact, i.e., recoverable as COS. As proof, no carbon dioxide and/or hydrogen sulfide are detectable in the regenerating solution, so that it is clear that such resin substantially completely avoids hydrolysis of the carbonyl sulfide during removal thereof. The mechanism of such regeneration is not completely understood, but it is believed that, in the case of an acidic regenerating agent in the present method, the regeneration may proceed as follows:

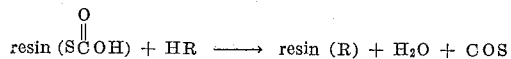

However, the present invention is not limited to this theory of operation. Moreover, it is believed that the regenerating agent, in effect, "poisons" the anionic exchange resin so that it can no longer act as a hydrolyzing agent or catalyst for COS but, instead, functions purely as an adsorber of COS. This increases the efficiency of the resin, since competing COS hydrolyzing and adsorbing actions no longer take place and hydrogen sulfide and carbon dioxide, both of which block the adsorbing action of the resin by being preferentially adsorbed with respect to the COS, are no longer produced by hydrolysis. Of course, the hydrolyzing action of the resin does not proceed in any event, if the resin and/or feed gas or liquid is not wet, i.e., contain an appreciable amount of water. Accordingly, the hydrolyzing action of the fresh anionic exchange resin is preferably suppressed, in accordance with the present method, by utilizing the fresh resin in the dry state and the resin regenerated by the present method in either the dry or wet state, since COS hydrolysis by the resin is blocked by the regenerating agent.

Hydrolyzing of COS achieved by fresh anionic exchange resin used in the wet state proceeds rather slowly and, as stated above, appears to materially interfere, as by the products of hydrolysis, $CO_2$ and $H_2S$, with adsorptive removal of COS, so that if the efficiency of removal of COS by fresh wet resin is compared with that of resin regenerated by the present method and used in either the wet or dry state, it is noted that the regenerated resin is more efficient than the wet fresh resin. In view of that, the present method preferably employs fresh dry resin and, after regeneration thereof, wet or dry resin. It will be understood that the activity of anionic exchange resin regenerated by the present method is about equal to that of fresh dry anionic exchange resin. However, the present method also includes the initial use of fresh wet resin, followed by the use, with improved efficiency, of resin regenerated by the present method.

Contacting between the hydrocarbon feed stream and the anionic exchange resin can be carried out in any suitable contacting zone of any suitable volume, size and shape. For example, a cylindrical pressurized vessel containing a generally vertical bed of the anion exchange resin can be used. A normally gaseous or liquid preferably dry hydrocarbon stream in the gaseous or liquid state can be passed into the vessel adjacent the top thereof and can be passed down through the resin bed, exiting the vessel at the bottom thereof. The hydrocarbon feed stream can be passed through the resin bed at any suitable flow rate, for example, in the case of a typical liquefied feed stream, at about a liquid hour space velocity (LHSV) of about 3. During such contacting, the bed can be maintained at about ambient temperature or at any other suitable temperature. The bed may exhibit a very high capacity for adsorption of carbonyl sulfide so that carbonyl sulfide can be removed to below detectable levels, that is, below 1 p.p.m., from hydrocarbon feed initially containing 35–50 p.p.m. carbonyl sulfide even after more than 80 barrels of the hydrocarbon feed per cubic feet of resin have passed through the bed. In one test, the carbonyl sulfide content of a liquefied hydrocarbon feed was lowered from 50 p.p.m. to below 1 p.p.m. for 80 barrels of feed/cubic foot of resin, and such resin continued to remove carbonyl sulfide down to below 5 parts per million until about 110 barrels of feed per cubic foot of resin had passed through the bed, whereupon the bed became saturated and regeneration of the resin was required.

Before the described removal of carbon sulfide from the hydrocarbon feed in accordance with the present method, other sulfur-bearing materials such as hydrogen sulfide which are preferentially adsorbed by the resin, in contrast to the carbonyl sulfide, can be removed from the hydrocarbon feed by any suitable means, conventional or otherwise. For example, hydrogen sulfide can be stripped from the feed by a caustic wash operation in a conventional manner. Mercaptans can also be removed by suitable conventional means, e.g., caustic wash, or cadmium chloride wash, etc. Thereupon, carbonyl sulfide removal, according to the present method, can be carried out. If the hydrogen sulfide and mercaptans are left in the feed, they can be removed by the resin in the present method. However, they tend to load the resin and therefore can be handled more effectively by conventional methods.

Further in accordance with the method of the present invention, the anion exchange resin is periodically regenerated in an improved and effective manner which completely restores the efficiency of the anion exchange resin for removal of carbonyl sulfide to that of fresh dry resin, in contrast to inefficient prior regeneration methods. The regeneration of the present invention is relatively simple and rapid and utilizes commercially available constituents. Such regeneration is carried out by contacting the spent resin with one or more selected regeneration agents. The regeneration agents are selected from the group consisting of effective alkanolamines and acids. With alkanolamines, methanol or another alcohol such as ethanol can be used as a carrier or dispersing medium. Water is another material in which selected alkanolamines are soluble or miscible and which does not deleteriously affect the resin. Accordingly, water can also be used where applicable. The alkanolamine may be any suitable alkanolamine, such as monoethanolamine, propanol amine and the like which may form a soluble product with the carbonyl sulfide and thus removes it from the resin. Primary amines, for example, butyl amine, cannot be used.

The alkanolamine can be utilized in any suitable concentration, preferably in a dilute concentration, for example 5 to 15 percent, by volume, in methanol solution. As an example, a 5 percent methanolic solution of monoethanolamine has been successfully utilized. Preferably, alkanolamines are selected which dissolve in water or other suitable dispersing media. Such amines should react with the carbonyl sulfide and preferably form soluble compounds therewith in the dispersing medium. Thus, for example, monoethanolamine forms a water soluble and alcohol soluble compound with carbonyl sulfide and, accordingly, the resulting compound is easily removed from the resin.

The regeneration agent may also be a suitable acid, preferably a strong mineral acid, for example, sulfuric or hydrochloric acid or the like. It is utilized in a dispersing medium, carrier or other medium in which it may be soluble or miscible. Preferably, water is employed as such medium. The acid is present in a sufficiently dilute concentration so as to avoid damage to the anionic exchange resin. In this regard, the acid is usually used, in the case of strong mineral acids such as hydrochloric acid, in a concentration of from about 5 to about 15 percent, by volume, in aqueous solution. Weaker acids, such as acetic acid, can be used in greater concentration, if desired. It has been found that the acid readily releases the carbonyl sulfide from the resin, so that the carbonyl sulfide usually forms a dark precipitate which can be readily washed from the resin.

Following the treatment with the regenerating agent, whether the regeneration agent is the selected alkanolamine or acid, the anionic exchange resin is freed of such agent, as by a water wash. The resin is then placed in the hydroxyl cycle by contacting it with a solution of base, for example, aqueous sodium hydroxide solution or potassium hydroxide solution, with the base in any suitable concentration, for example, 5 to 15 percent, by volume. The resin can then be washed free of the base by a water wash, although this is not necessary. Any suitable quantity of regenerating solution, washing solution and base solution can be used with the resin, for example, from about 4 to 20 volumes of each solution per volume of the resin. The resin can then be completely dried, exclusive of bound water, or surface dried or left wet and in any event need not be in a fully hydrated state, that is, it need not contain both bound and unbound water when reutilized for contacting additional hydrocarbon feed for the removal of carbonyl sulfide therefrom, in the manner previously described. Instead, it can be surface dried, partially hydrated or substantially completely hydrated, as desired. As previously indicated, the fresh resin should be dry (unhydrated, i.e., not containing unbound water, but which may contain bound water) for maximum efficiency. If hydrated (wet), the efficiency of the fresh resin is somewhat impaired.

The following examples further illustrate certain features of the present invention.

Example I

A dry liquefied stream containing propylene at a pressure of about 200 p.s.i. was treated in accordance with the present method. The propylene contained about 50 p.p.m. of carbonyl sulfide, calculated as sulfur. The liquefied propylene was passed through a pressure vessel containing a bed of anionic exchange resin comprising the reaction product of a tertiary amine with a haloalkylated vinyl aromatic hydrocarbon copolymer. The resin was surface dry (essentially free of unbound water) and in the hydroxyl cycle. The flow rate was about 3 LHSV and the bed was at ambient temperature. During contacting with the resin, the propylene was maintained in a liquid state. The sulfur content of the liquefied propylene stream after passing through the bed had a concentration of carbonyl sulfide below 1 p.p.m. until after 80 barrels of feed per cubic foot of resin had passed through the bed. Carbonyl sulfide removal was continued to a total of 110 barrels of feed per cubic foot of resin, at which time the feed after passing through the bed had slightly less than 5 p.p.m. of carbonyl sulfide.

The hydrocarbon feed through the bed was then shut off and the bed was regenerated by passing therethrough 8 volumes of each of the following solutions in the following sequence: 10 percent, by volume, aqueous hydrochloric acid solution; water; 15° Baumé aqueous caustic (sodium hydroxide) solution; and water.

The regenerated exchange resin was then allowed to drip dry, after which it was removed from the pressure vessel, stored for one month until it was fully dried, exclusive of bound water (water of crystallization), then anionic exchange resin and the resin after it had been regenerated in accordance with various procedures. The test conditions and results are set forth in the following Table I below:

TABLE I

| Run | "A" | "B" | "C" | "C'" |
|---|---|---|---|---|
| Catalyst | New Iron Impregnated Activated Carbon. | New Iron Impregnated Activated Carbon. | Resin [1] | Run "C" Continued; LHSV increased to 3.0. |
| Treat (initial and regeneration). | None | None | 4% by vol. Caustic (NaOH) at 1.0 LHSV 10 Bed Vols. up through Bed. | |
| Carbonyl Sulfide, p.p.m. in Feed. | 101 | 101 | 101 | 101. |
| Pressure, p.s.i.g | 350 | 350 | 300 | 300. |
| Temperature, °F | Ambient | | | |
| LHSV | 4.3 | 1.0 | 1.0 | 3.0. |
| Treated Propylene, p.p.m. of Carbonyl Sulfide: | | | | |
| Bbl./ft.³ | 0.53 | 1.2 | 10 | 24.0. |
| P.p.m., COS | 11 | 11.1 | Nil | Nil. |

| Run | "D" | "E" | "F" | "G" |
|---|---|---|---|---|
| Catalyst | Resin [1] Used in Run "C" | Resin [1] Used in Runs "C" and "D". | Resin [1] Used in Runs "C", "D" and "E". | Resin [1] Used in Runs "C", "D", "E" and "F". |
| Treat (initial and regeneration). | Regenerated with 7 Bed Vols. of 4% Caustic (NaOH) up through Bed at 2 LSHV, then Washed with Water to pH 7.0. | 30% by vol. Caustic (NaOH) up through Bed. | 30% by vol. Caustic (NaOH down through Bed. | 10% by vol., HCl, then Water Wash, then 15 Be'. Caustic (NaOH) Treat. |
| Carbonyl Sulfide p.p.m. in Feed. | 101 | 53 | 53 | 35. |
| Pressure, p.s.i.g | 290 | 290 | 290 | 290. |
| Temperature, °F | | | | |
| LHSV | 3.0 | 4.0 | 3.0 | 3.0. |
| Treated Propylene—p.p.m. of Carbonyl Sulfide: | | | | |
| Bbl./ft.³ | 4.5 | 29 | 5.8 | 111. |
| P.p.m., COS | 3.2 | 75 | 75 | Nil. |

[1] Commercially available amine type anionic exchange resin.

returned to the pressure vessel, whereupon passage of liquefied propylene therethrough was begun under the initial conditions without rewetting the resin. Results substantially identical to those obtained with the fresh dry resin were obtained with the regenerated resin. In this regard, the carbonyl sulfide content of the processed feed remained below detectable levels until after 84 barrels of the feed per cubic foot of regenerated resin had been processed. Moreover, the carbonyl sulfide content of the processed feed remained below 5 p.p.m. until after 110 barrels of feed per cubic foot of regenerated resin had passed through the regenerated bed.

Accordingly, the efficiency of the regenerated resin utilized when dry was found to be equal to that of the fresh dry resin.

In another experiment, the same dry anion exchange resin was effectively regenerated, after saturation with carbonyl sulfide, to its initial activity by the use of monoethanolamine. The regeneration comprised passing 4 volumes of a solution comprising 10 percent, by volume, of monoethanolamine in methanol through the spent resin, after which the resin was washed with 10 volumes of water and then treated with 4 volumes of a 10 percent by volume aqueous sodium hydroxide solution. The regenerated resin was then placed while still wet in a pressure vessel and contacted under the previously described conditions with liquefied propylene at 200 p.s.i. The results obtained with the regenerated resin were substantially identical to those of the fresh resin. Accordingly, monoethanolamine was found to be as effective as acid for the complete regeneration of the anion exchange resin, that is, the complete restoration of the initial efficiency of the resin for removal of carbonyl sulfide from hydrocarbon streams. Moreover, it was found that once the resin was regenerated, it could be used at initial dry resin efficiency whether the regenerated resin was utilized in the wet or dry state.

*Example II*

Tests were run to determine the efficiency of removal of carbonyl sulfide from a liquefied propylene stream by the use of impregnated activated carbon, fresh (new)

Table I clearly illustrates that fresh anionic exchange resin, even when in the wet, fully hydrated state, is more efficient for the removal of carbonyl sulfide from propylene, as Runs "C" and "C'," than fresh iron impregnated activated carbon, as in Runs "A" and "B." Moreover, when the resin was regenerated in accordance with the method of the present invention, as in Run "G," it was also much more effective than the iron impregnated activated carbon and was at least as efficient as the fresh resin. However, when the resin was regenerated merely through the use of an aqueous caustic (NaOH) solution followed by a water wash in accordance with conventional procedure, whether the caustic solution was a 4 percent, by volume, caustic solution or for example, 30 percent, by volume, caustic solution, as in Runs "D," "E," and "F," the efficiency of removal of the carbonyl sulfide by resin regenerated in such a manner was substantially lower than that of the fresh resin or resin regenerated according to the present method, and either was somewhat more efficient than the iron impregnated activated carbon, as in Run "D," or was considerably less efficient than that absorbent, as in Runs "E" and "F," depending on the strength of the caustic used in the regeneration.

Table I further illustrates that even if the anionic exchange resin has been substantially reduced in activity by prior regenerations using caustic solutions, it can be restored to at least its initial or new resin activity, merely through the use of the regeneration step of the present method. Accordingly, the results set forth in Table I clearly indicate that the regeneration in accordance with the present method is highly effective, in contrast to conventional methods, in renewing the activity of the resin, so that the resin can continue to remove carbonyl sulfide.

*Example III*

Tests were performed to compare the efficiency of the present method for the removal of carbonyl sulfide from hydrocarbons in the gas phase and from hydrocarbons in the liquid phase against a method using the same resin but regenerating the resin by a conventional technique employing only an aqueous caustic solution.

In carrying out the tests of Run "H," a gaseous mixture comprising approximately 90 percent by volume of propane and 10 percent by volume of carbonyl sulfide was used as the feed material and samples were taken after each 0.1 cubic foot of the feed gas passed through the resin bed. The same resin as set forth in Example II was employed in a bed weight of 53.8377 grams and at ambient temperature and pressure. In Part I of Run "H" the fresh resin was converted to the hydroxyl cycle by passing 20 bed volumes of 10 percent, by volume, aqueous sodium hydroxide solution down through the bed disposed at an LHSV of 5. The bed was then washed with 5 bed volumes of distilled water at an LHSV of 5. The fresh resin was used in the wet, fully hydrated state. Subsequently, the resin was regenerated by various techniques (Parts II, III and IV of Run "H") and used in the wet, fully hydrated state. The results of Run "H" are set forth in Table II below:

TABLE II RUN "H")
Resin Treat:
Part I.—Fresh resin in hydroxyl cycle:

| | Percent by Volume, Removal of COS from Feed |
|---|---|
| After 0.1 cu. ft. treated gas | 15 |
| After 0.2 cu. ft. treated gas | 3 |
| After 0.3 cu. ft. treated gas | 0 |

Part II.—Resin regenerated in same manner as conversion of fresh resin to hydroxyl cycle:

| | Percent by Volume, Removal of COS from Feed |
|---|---|
| After 0.1 cu. ft. treated gas | 1 |
| After 0.2 cu. ft. treated gas | 0 |

Part III.—Resin regenerated with 5 bed volumes of 5%, by volume, monoethanolamine in methanol, followed by conversion to hydroxyl cycle as for fresh resin:

| | Percent by Volume, Removal of COS from Feed |
|---|---|
| After 0.1 cu. ft. treated gas | 15 |
| After 0.2 cu. ft. treated gas | 7 |
| After 0.3 cu. ft. treated gas | 4 |
| After 0.4 cu. ft. treated gas | 0 |

Part IV.—Resin regenerated with 5 bed volumes of 10%, by volume, of aqueous hydrochloric acid solution, followed by conversion to hydroxyl cycle as for fresh resin:

| | Percent by Volume, Removal of COS from Feed |
|---|---|
| After 0.1 cu. ft. treated gas | 15 |
| After 0.2 cu. ft. treated gas | 8 |
| After 0.3 cu. ft. treated gas | 3 |
| After 0.4 cu. ft. treated gas | 0 |

Run "H" clearly illustrates that the present regeneration method (Part III and Part IV) is much more efficient than conventional resin regeneration (Part II) and that the present regeneration increases the activity and efficiency of the regenerated resin to above that of the fresh wet fully hydrated resin (Part I), apparently by totally blocking inefficient COS hydrolysis by the resin.

Run "J" was then carried out utilizing a larger, more efficient resin bed volume, i.e., 265.7 gm. of the anionic exchange resin commercially known as Ionac A-260 and previously described. In Part I of Run "J," the fresh resin was converted to the hydroxyl cycle in the same manner as for the fresh resin of Part I of Run "H," but using 4 bed volumes of 10 percent, by volume, aqueous sodium hydroxide solution and down flowing it at 2 LHSV, and following this by a water wash with 2 bed volumes of water at 2 LHSV. The same feed gas, temperature and pressure were used as with Run "H" and the results are set forth in Table III below:

TABLE III (RUN "J")
Resin Treat:
Part I.—Fresh resin in hydroxyl cycle (used wet):

| | Percent by Volume, Removal of COS from Feed |
|---|---|
| After 0.1 cu. ft. treated gas | 85 |
| After 0.2 cu. ft. treated gas | 81 |
| After 0.3 cu. ft. treated gas | 76 |
| After 0.4 cu. ft. treated gas | 55 |
| After 0.5 cu. ft. treated gas | 30 |
| After 0.6 cu. ft. treated gas | 5 |
| After 0.7 cu. ft. treated gas | 0 |

Part II.—Resin regenerated in same manner as conversion of fresh resin to hydroxyl cycle (used wet):

| | Percent by Volume, Removal of COS from Feed |
|---|---|
| After 0.1 cu. ft. treated gas | 68 |
| After 0.2 cu. ft. treated gas | 55 |
| After 0.3 cu. ft. treated gas | 23 |
| After 0.4 cu. ft. treated gas | 6 |
| After 0.5 cu. ft. treated gas | 0 |

Part III.—Resin regenerated with 4 bed volumes of 10% by volume aqueous HCl, then water wash, then conversion to hydroxyl cycle as with fresh resin (used wet):

| | Percent by Volume, Removal of COS from Feed |
|---|---|
| After 0.1 cu ft. treated gas | 100 |
| After 0.2 cu. ft. treated gas | 100 |
| After 0.3 cu. ft. treated gas | 95 |
| After 0.4 cu. ft. treated gas | 88 |
| After 0.5 cu. ft. treated gas | 82 |
| After 0.6 cu. ft. treated gas | 55 |
| After 0.7 cu. ft. treated gas | 28 |
| After 0.8 cu. ft. treated gas | 8 |
| After 0.9 cu. ft. treated gas | 3 |
| After 1.0 cu. ft. treated gas | 0 |

The results of Run "J" clearly show that when the resin is regenerated in accordance with the present method (Part III), i.e., by the use of a regeneration agent which, for example, comprises a strong mineral acid such as hydrochloric acid in aqueous solution, and is then reconverted to the hydroxyl cycle, it performs with an efficiency greater than that of the new wet fully hydrated resin (Part I) for the removal of carbonyl sulfide. This is strongly contrasted with the results obtained when the resin is regenerated merely by the sodium hydroxide wash in accordance with prior art (Part II). In such instance, the regenerated resin performs with substantially less efficiency for the removal of carbonyl sulfide than does the fresh wet resin or wet regenerated resin. Clearly, regeneration of the resin in accordance with the present method is superior to regeneration by the method of Part II. Moreover, in parallel tests, it was found that when the spent resin was regenerated by the method of Part III and then surface dried and reused, it had an efficiency substantially identical to that of the wet regenerated resin and comparable to that of the fresh resin used in the surface dry hydrolyzed, unhydrated (not containing essentially any unbound water) state. It was also found that the regenerating agent removed carbonyl sulfide intact from resin which had been used in the regenerated state (regenerated by the present method) and from fresh resin which had been used in the dry, hydrolyzed state.

Run "K" was next performed, using the same bed of resin as for Run "J" and utilizing the same feed, but in the liquefied state under pressure of about 200 p.s.i., in a pressure vessel, instead of in the gaseous state at ambient pressure. In Part I of Run "K", the spent resin from Part III of Run "J" was regenerated with 4 bed volumes of 10 percent, by volume, aqueous sodium hydroxide solution, followed by a water wash comprising 2 bed volumes of distilled water and then used wet. In Part II the spent resin was then regenerated in accordance with the present method and used wet. The results of Run "K" are as set forth in Table IV below:

TABLE IV (RUN "K")

Resin Treat:

Part I.—Resin regenerated by 4 bed volumes of 10%, by volume, aqueous NaOH, followed by 2 bed volume water wash (used wet):

| | Percent Removal of COS from Liquid Feed |
|---|---|
| After 0.1 cu. ft. liquid feed | 65 |
| After 0.2 cu. ft. liquid feed | 45 |
| After 0.3 cu. ft. liquid feed | 15 |
| After 0.4 cu. ft. liquid feed | 9 |
| After 0.5 cu. ft. liquid feed | 4 |
| After 0.6 cu. ft. liquid feed | 0 |

Part II.—Resin regenerated by 4 bed volumes of 10% by volume aqueous HCl, then 4 bed volumes of 10% by volume aqueous NaOH, followed by 2 bed volume water wash (used wet):

| | Percent Removal of COS from Liquid Feed |
|---|---|
| After 0.1 cu. ft. liquid feed | 100 |
| After 0.2 cu. ft. liquid feed | 100 |
| After 0.3 cu. ft. liquid feed | 80 |
| After 0.4 cu. ft. liquid feed | 95 |
| After 0.5 cu. ft. liquid feed | 94 |
| After 0.6 cu. ft. liquid feed | 74 |

The results obtained in Run "K" clearly indicate that the regeneration of the resin by the method of the present invention (Part II), i.e., the use of a suitable regenerating agent which may be for example, a strong mineral acid in aqueous solution, followed by conversion of the resin to the hydroxyl cycle, allows the resin to perform with the efficiency of fresh dry resin, in contrast to resin regenerated merely by an aqueous sodium hydroxide solution (Part I), in accordance with conventional practice, which resin has substantially decreased efficiency of removal of carbonyl sulfide from liquid hydrocarbon streams. Thus, it will be noted that the resin in Part II, Run "K" was initially more efficient and removed more COS for a longer treat time than it did in Part I, Run "K."

In similar tests performed utilizing monomethanolamine and monopropanolamine as regenerating agents in a 5–15 volume percent concentration in various alcohols, including methanol, ethanol and similar alcohols, it was found that the anionic exchange resin could be completely regenerated to its initial dry (free of unbound water) hydrolyzed activity and efficiency for removal of carbon sulfide and that the results obtained with such alkanolamines as regeneration agents were comparable in every respect to those obtained through the use of the strong mineral acids.

Further tests have been run utilizing sulfuric acid and acetic acid in 5–15 volume percent concentration in water in place of hydrochloric acid as regenerating agents for anionic exchange resins, and results comparable to those obtained for the hydrochloric acid regenerating agent, as set forth in the preceding tables, were obtained.

The examples clearly demonstrate advantages of the present method in contrast to conventional carbonyl sulfide removal methods. In this regard, the examples have established that an anion exchange resin cannot be fully and effectively regenerated to provide the resin with an activity level substantially equivalent to that of fresh resin through the use of only an aqueous caustic solution for the regeneration. In addition, the examples establish that the hydrocarbon feed can be in either the liquid or gaseous state and still enjoy the advantages of the present invention.

Moreover, the examples demonstrate that regenerated resin in accordance with the method of the present invention does not have to be and preferably is not in the hydrated or wet state in order to substantially completely remove carbonyl sulfide from hydrocarbon feeds. The examples also show that the regenerating agent of the present method can be an acid or an alkanolamine, and that regeneration is followed by the use of an aqueous caustic solution to convert the resin to the hydroxyl cycle. The regenerating agent restores the initial activity of the dry fresh resin for COS removal and exceeds the activity of the wet fresh resin for COS removal.

The examples further establish that the method of the present invention involves the removal of carbonyl sulfide from the hydrocarbon feed by dry (containing only bound water) anion resin in the hydroxyl cycle and/or dry or wet resin regenerated by the present method, which removal occurs by some type of bonding or physical adsorption which does not substantially depend upon hydrolysis of the carbonyl sulfide to hydrogen sulfide and carbon dioxide. Instead, during regeneration, the carbonyl sulfide is released from the resin in substantially unaltered form and in a given instance no carbon dioxide and hydrogen sulfide have been detected in the regenerating solution. Accordingly, substantial hydrolysis of carbonyl sulfide to hydrogen sulfide and carbon dioxide does not occur in the present method where wet fresh resin is not employed.

The improved method of the present invention can be operated equally effectively on a batch, semi-batch, intermittent or continuous basis using one or a plurality of beds of anionic exchange resin. The method involves regeneration of the anionic exchange resin in a rapid, simple and effective manner at suitable intervals to the initial activity of the anion exchange resin, whereby the effectiveness of the method in removing carbonyl sulfide from liquid and gaseous hydrocarbon feed streams is maximized. Thus, the method is effective in removing carbonyl sulfide to very low concentrations from large volumes of feed and the resin utilized therein, upon periodic regeneration, can be utilized almost indefinitely. Further advantages of the method are as set forth in the foregoing.

It will be obvious that various modifications, changes, additions and alterations in the present method can be made without departing from the nature, scope and intention of the present invention. All such modifications, alterations, additions and changes in the present method as are within the scope of the appended claims form a part of the present invention.

What is claimed is:

1. A method of regenerating anionic exchange resin containing absorbed carbonyl sulfide, which method comprises regenerating anionic exchange resin containing carbonyl sulfide by contacting said resin with a solution containing regenerating agent effective to remove carbonyl sulfide intact from said resin, said regenerating agent being selected from the group consisting of monoethanolamine, propanol amine, hydrochloric acid, sulfuric acid and acetic acid, said regenerating agent being present in an amount sufficient to remove sufficient unhydrolyzed carbonyl sulfide from said resin to restore the activity of said resin to at least about initial resin activity and suppress the hydrolytic activity of said resin, thereafter washing the regenerated resin free of said regenerating agent, contacting the resulting regenerated resin with aqueous base, whereby said regenerated resin is converted to the hydroxyl cycle and is ready for use in the removal of carbonyl sulfide from a hydrocarbon stream.

2. The method of claim 1 wherein said regenerating agent is monoethanolamine in a concentration of about 5–15 percent, by volume, of said solution.

3. The method of claim 1 wherein said regenerating agent is propanol amine in a concentration of about 5–15 percent, by volume, of said solution.

4. The method of claim 1 wherein said regenerating agent is hydrochloric acid in a concentration of about 5–15 percent, by volume, of said solution.

5. The method of claim 1 wherein said regenerating agent is sulfuric acid in a concentration of about 5–15 percent, by volume, of said solution.

References Cited by the Examiner

UNITED STATES PATENTS

| | | | |
|---|---|---|---|
| 2,713,077 | 7/1955 | Rieve | 208—240 |
| 2,718,489 | 9/1955 | Coonradt et al. | 208—240 |
| 2,730,486 | 1/1956 | Coonradt et al. | 208—240 |
| 2,831,799 | 4/1958 | Coonradt et al. | 208—240 |
| 3,108,948 | 10/1963 | Ring | 208—240 |

DELBERT E. GANTZ, *Primary Examiner.*

S. P. JONES, *Assistant Examiner.*